US010614272B2

(12) United States Patent
Shope et al.

(10) Patent No.: US 10,614,272 B2
(45) Date of Patent: Apr. 7, 2020

(54) NETWORKED COMPUTER SYSTEM FOR REMOTE RFID DEVICE MANAGEMENT AND TRACKING

(71) Applicant: Purple Deck Media, Inc., Scotland, PA (US)

(72) Inventors: Daniel Lee Shope, Chambersburg, PA (US); James Henry Sulfare, Jr., Willow Hill, PA (US); Nathan James Neil, Chambersburg, PA (US)

(73) Assignee: PURPLE DECK MEDIA, INC., Scotland, PA (US)

( * ) Notice: Subject to any disclaimer, the term of this patent is extended or adjusted under 35 U.S.C. 154(b) by 0 days.

(21) Appl. No.: 16/141,698

(22) Filed: Sep. 25, 2018

(65) Prior Publication Data

US 2019/0026512 A1    Jan. 24, 2019

Related U.S. Application Data

(62) Division of application No. 15/058,965, filed on Mar. 2, 2016, now Pat. No. 10,114,990.

(Continued)

(51) Int. Cl.
*H04L 29/06* (2006.01)
*G06K 7/10* (2006.01)
(Continued)

(52) U.S. Cl.
CPC .......... *G06K 7/10366* (2013.01); *G06F 3/14* (2013.01); *G06F 16/951* (2019.01);
(Continued)

(58) Field of Classification Search
CPC ......... G06F 17/30864; G06F 17/30876; G06F 21/35; G06F 21/64; G06F 16/951; G06F 16/955; G06F 3/033; G06F 3/0346; G06F 3/0354; G06F 3/038; G06F 3/0482; G06F 3/04842; G06F 3/04845; G06F 3/04847; G06F 3/0488; G06F 3/14; G06F 3/1454; G06F 3/1462; H04L 63/102; H04L 2463/082; H04L 63/0421; H04L 63/0823; H04L 63/083; H04L 67/12; H04L 63/0428; H04L 67/04; H04L 67/125; H04L 63/062;
(Continued)

(56) References Cited

U.S. PATENT DOCUMENTS 7,679,512 B2    3/2010   Vest et al.
7,701,341 B2    4/2010   Kumar et al.
(Continued)

OTHER PUBLICATIONS

International Search Report and Written Opinion dated Jul. 11, 2016 issued in the PCT/US2016/020497 filed Mar. 2, 2016.

*Primary Examiner* — Dionne Pendleton
(74) *Attorney, Agent, or Firm* — McGuireWoods LLP

(57) ABSTRACT

A networked computer system for remote RFID device management and tracking provides a means for quickly deploying and managing RFID based technologies, serving both large and small use cases. The remote management and auditing tools significantly reduce labor force requirements by removing the physical interaction requirement, and permit new possibilities since clients can manage devices from any internet connected locale. The low entry and operational costs permit solutions which provide RFID devices to end users and their devices.

12 Claims, 7 Drawing Sheets

Related U.S. Application Data

(60) Provisional application No. 62/127,528, filed on Mar. 3, 2015.

(51) Int. Cl.

| | | |
|---|---|---|
| *G06F 17/30* | (2006.01) | |
| *G06Q 10/08* | (2012.01) | |
| *G06F 16/951* | (2019.01) | |
| *H04W 88/12* | (2009.01) | |
| *H04W 4/80* | (2018.01) | |
| *H04W 88/04* | (2009.01) | |
| *G06F 3/14* | (2006.01) | |
| *H04W 88/16* | (2009.01) | |

(52) U.S. Cl.
CPC ....... *G06K 7/10386* (2013.01); *G06Q 10/087* (2013.01); *H04L 63/0823* (2013.01); *H04L 63/101* (2013.01); *H04L 63/102* (2013.01); *H04W 4/80* (2018.02); *H04W 88/04* (2013.01); *H04W 88/12* (2013.01); *H04W 88/16* (2013.01)

(58) Field of Classification Search
CPC ..... H04L 63/08; H04L 63/0807; H04L 63/12; H04L 63/0435; H04L 63/061; H04L 63/101; G06K 7/10366; G06K 7/10; G06K 7/10128; G06K 7/10376; G06K 2007/10524; G06K 7/0004; G06K 7/10217; G06K 7/10386; G06K 7/1413; G06Q 10/087; G06Q 20/3674; G06Q 20/4014; G06Q 10/20; G06Q 30/0239; G06Q 30/0273; G06Q 10/08; G06Q 30/02; G06Q 30/0234; H04W 12/02; H04W 12/06; H04W 84/18; H04W 4/80; H04W 76/14; H04W 88/04; H04W 12/08; H04W 4/029; H04W 4/70; A61B 6/145; A61B 6/4411; A61B 6/4494; G03B 42/047; G08C 17/02; H04B 7/24; H04M 1/7253; H04M 2250/12; H04Q 2209/40; H04Q 9/00; H04Q 2209/47; H04N 2005/441; H04N 2005/443; H04N 21/4131; H04N 21/42207; H04N 21/42209; H04N 21/42222; H04N 21/42224; H04N 21/4312; H04N 21/4782; H04N 5/4403; G09G 5/12
See application file for complete search history.

(56) References Cited

U.S. PATENT DOCUMENTS

| | | | |
|---|---|---|---|
| 8,077,041 B2 | 12/2011 | Stern et al. | |
| 8,284,056 B2 | 10/2012 | McTigue | |
| 8,321,302 B2 | 11/2012 | Bauer et al. | |
| 8,447,829 B1* | 5/2013 | Geller | G06F 9/468 |
| | | | 709/217 |
| 8,645,697 B1* | 2/2014 | Emigh | H04L 63/0227 |
| | | | 370/352 |
| 10,474,836 B1* | 11/2019 | Cieslak | G06F 21/6245 |
| 2001/0021950 A1* | 9/2001 | Hawley | G06F 16/955 |
| | | | 709/225 |
| 2006/0113369 A1 | 6/2006 | Taylor et al. | |
| 2008/0055085 A1 | 3/2008 | Sambousky et al. | |
| 2008/0065496 A1 | 3/2008 | Fowler et al. | |
| 2009/0174653 A1* | 7/2009 | Shin | G06F 3/0346 |
| | | | 345/156 |
| 2010/0090004 A1 | 4/2010 | Sands et al. | |
| 2012/0316992 A1 | 12/2012 | Oborne | |
| 2013/0134213 A1 | 5/2013 | Pallakoff et al. | |
| 2013/0226712 A1* | 8/2013 | Lietsalmi | G06Q 30/0273 |
| | | | 705/14.69 |
| 2014/0181927 A1 | 6/2014 | Sarkissian | |
| 2014/0191852 A1* | 7/2014 | Inglese | A61B 6/145 |
| | | | 340/10.52 |
| 2014/0266613 A1 | 9/2014 | Sehmer et al. | |
| 2014/0347193 A1* | 11/2014 | Ljung | H04L 67/04 |
| | | | 340/870.01 |
| 2014/0361872 A1 | 12/2014 | Garcia et al. | |
| 2017/0005999 A1* | 1/2017 | Choyi | H04L 63/0435 |
| 2017/0041296 A1 | 2/2017 | Ford et al. | |
| 2017/0236118 A1 | 8/2017 | Laracey | |

\* cited by examiner

NETWORKED COMPUTER SYSTEM FOR REMOTE RFID DEVICE MANAGEMENT AND TRACKING

CROSS-REFERENCE TO RELATED APPLICATIONS

This application is a divisional of co-pending U.S. patent application Ser. No. 15/058,965 filed Mar. 2, 2016, which claims benefit and priority to U.S. Provisional Patent Application No. 62/127,528 filed Mar. 3, 2015, the disclosures of which are incorporated by reference herein in their entirety.

BACKGROUND

Field of the Invention

The present disclosure generally relates to a system and method for RFID device management and tracking and, more particularly, to a system and method for RFID device management and tracking including remote management and tracking over networks, among other features.

Related Art

RFID devices may be deployed in mass quantities for retail, advertising, logistics purposes, and the like. Management of the content linked to these RFID devices must be performed locally, which is slow and labor intensive. Tracking usage of these RFID devices is typically enabled only via custom hardware and software implementations for each vendor using RFID devices, limiting audit frequency and potential applications.

Clients or users are often unable to quickly test and deploy new RFID technologies as they are compelled to produce custom software and hardware solutions. Once deployed, management of these RFID devices requires physical interaction with each RFID device to update or retrieve stored information. The physical interaction necessity is cumbersome, time consuming and costly, and tends to inhibit rapid deployment.

A system and method for more quickly deploying and managing existing and future RFID based technologies that is scalable would significantly reduce labor force requirements by removing need for ongoing physical interaction with the RFID devices. Moreover, a technique for managing RFID devices remotely would further reduce operational costs and permit new deployment possibilities.

SUMMARY OF THE DISCLOSURE

The present disclosure overcomes the limitations and problems as described above.

In one aspect, a system for tracking articles or providing information is provide, the systems may comprise an RFID reader to read one of a plurality of RFID devices to receive at least one token from among a plurality of tokens, each of the RFID devices physically associated with one or more objects; a server to receive a request from the RFID reader, the request including the at least one token, and the server configured to send at least one payload to the RFID reader; a database to store a plurality of datasets and a plurality of payloads including the at least one payload, the database searchable by the server using the received token; a display device associated with the RFID reader to display the at least one payload. The RFID device may comprise a near field communication device. The token may comprise a globally unique identifier (GUID). The at least one token maybe permanently encoded on the one of a plurality of RFID devices. The at least one token may comprises a plurality of different tokens and each different token may be permanently encoded on a different at least one of the plurality of RFID devices. The at least one payload may comprise information related to the one or more objects. The server may track the location of the one of a plurality of RFID devices. The system may further comprising an RFID writer to permanently write the at least one token to the one of the plurality of RFID devices. The RFID writer may write metadata to the one of the plurality of RFID devices.

In one aspect, a method for tracking articles or providing information is provided, the method comprising reading at least one token from at least one RFID device and conveying the at least one token over a network to a server, searching by the server a database using the token to identify a stored dataset associated with the token, and communicating a payload associated with the identified dataset to a device for displaying information in the payload on a display device. The at least one RFID device may be a near field communication device. The display device may comprise an RFID reader. The method may further comprise establishing by the server at least one client credential for creating the plurality of datasets and tokens. The method may further comprise establishing by the server at least one third party credential, the third party credential permitting a third party to create at least one second dataset and at least one second token for associating with a physical object. The method may further comprise receiving a request from a client or third party to change the payload of the stored dataset associated with the token from a first set of information to a second set of information different from the first set of information. The method may further comprise permanently writing the at least on token to the RFID device. The method may further comprise authenticating at least one client to create one or more third party credentials for at least one third party. The method may further comprise creating by the at least one third party a second dataset and a second payload for displaying on the display device based on the at least one conveyed token. The third party may be a plurality of third parties and each third party creates a set of datasets and tokens for associating with different RFID devices and objects.

In one aspect, a method for tracking articles or providing information is provided, the method comprising creating different credentials for different third parties by a client, the different credentials permitting the different third parties to create different datasets and different tokens for associating with different objects, receiving a request including a token from at least one RFID device over a network, searching a database to locate a dataset and payload associated with the token and displaying information associated with the payload on a display device at a RFID reader that generated the request. The RFID device is a near field communication device. The method may further comprise permanently writing the token to the at least one RFID device. The method may further comprise permanently writing the token to a plurality of RFID devices so that each RFID device has the same token

BRIEF DESCRIPTION OF THE DRAWINGS

The accompanying drawings which are included to provide a further understanding of the disclosure are incorporated in and form a part of this specification, illustrate examples of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings.

DESCRIPTION OF THE DISCLOSURE

Figure 1:
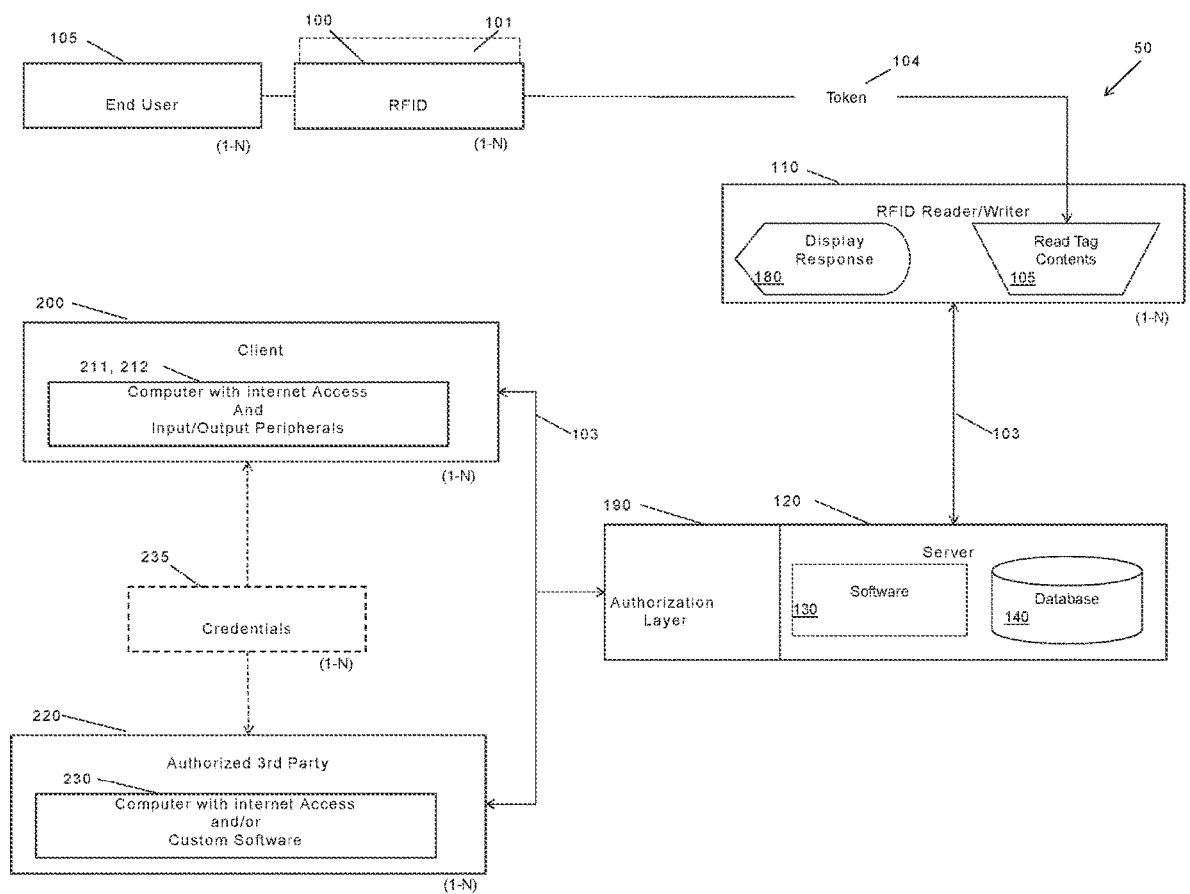
FIG. 1 is a functional block diagram of an example of system architecture, configured according to principles of the disclosure.

The disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the principles of the disclosure. The examples used herein are intended merely to facilitate an understanding of ways in which the disclosure may be practiced and to further enable those of skill in the art to practice the features and capabilities of the disclosure. Accordingly, the examples herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like. Further, the computer may include an electronic device configured to communicate over a communication link. The electronic device may include a computing device, for example, but is not limited to, a mobile telephone, a personal data assistant (PDA), a mobile computer, a stationary computer, a smart phone, mobile station, user equipment, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database" as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "network," as used in this disclosure, means an arrangement of two or more communication links. A network may include, for example, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a point-to-point topology, a bus topology, a linear bus topology, a distributed bus topology, a star topology, an extended star topology, a distributed star topology, a ring topology, a mesh topology, a tree topology, or the like. Online refers to and includes activity on a network by connected users of the network. A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G, 4G or 5G cellular standards, Bluetooth, or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-transitory media or storage, non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes or altered make-up, a RAM, a PROM, an EPROM, a FLASHEEPROM, any other memory chip or cartridge, or any other tangible medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G, 4G or 5G cellular standards, Bluetooth, or the like.

Glossary

Client—an entity that owns account credentials and can access the software.
End User—person who interacts with the RFID device and/or reader/writers.
Software—the server side implementation of control logic and routines.
Firmware—the RFID reader/writer side implementation of control logic and routines.
Near Field Communication (NFC)—a set of protocols that enable two electronic devices to establish radio communication when in close proximity with each other; subset of RFID.
RFID Device/NFC Tag—a passive (unpowered) data storage device that can be read by an RFID reader, and/or written to by an RFID writer.
Dataset—software construct that links the payload and token.
Payload—renderable and/or actionable content that may be client generated.
Token—a globally unique identifier for each RFID device or NFC tag, generated at time of device creation or programming. The token may be different for different RFID devices.
Metadata—structured information that describes the entity to which it is attached.

In one aspect, the system methods herein provide for quickly deploying and managing existing and future RFID based technologies which may include NFC, and may be built to scale. The remote management and auditing tools significantly reduce labor force requirements by removing much of the physical interaction requirement, and may permit new possibilities since clients can manage devices from any internet connected locale. The low entry and operational costs permit solutions which provide RFID devices to public end users and their devices.

FIG. 1 is a functional block diagram of an example of system architecture, configured according to principles of the disclosure. FIG. 1 shows various components of system 50 including an RFID device 100 that may be associated with or attached to an object 101, an article or product (e.g., a card, a flyer, an asset, a container, a consumer good, or the like) and may be readable by a RFID reader/writer 110. In some applications, the RFID reader/writer 110 may be two separate devices, one for reading and one for writing, each may be in communication with server 120. An RFID reader/writer 110 may comprise, e.g., an integrated circuit (IC) and antenna interfaced to an embedded microcontroller, an USB enabled RFID reader/writer peripheral, a smartphone (or cell phone) with embedded RFID reader/writer controller and antenna(s), a handheld RFID reader/writer with optional screen (usually industrial), or the like.

The RFID tag 100 may communicate a token 104 including any tag contents. The RFID reader/writer 110 may be configured to display data, such as the tag contents, on a display 180. The RFID reader/writer 110 may be operatively connected over a communication link, such as network 103, to a server 120. The server 120 may comprise software 130 executable by a processor on the server 120, the software 130 configured with software logic for controlling and managing many of the features described herein. The server 120 may include, or be in communication with, a database 140 and an authorization layer 190, described in more detail below. The server 120 may be in communication over a communication link, such as network 103, with a client 200 and an authorized third party 220. Client 200 may have or involve a computer processor, a computer monitor 211 a computer keyboard and/or other input devices 212. The third party 220 may comprise a computer, a display and software, denoted by reference numeral 230, for communicating over network 103. The client 200 may be one client of a plurality of clients (1-N). Moreover, the third party 220 may be one third party of a plurality of third parties (1-N). The RFID reader/writer 110 may be one of a plurality of RFID reader/writers (1-N).

To illustrate an aspect of operation by an example, the RFID device 100 may be a passive or active RFID device and may be scanned using the RFID reader/writer 110 which is able to transmit and receive data via the network 103, which may be the internet. The scanned information may be transmitted via the network 103 using standard protocols to the server 120 which may record the scanned device information into the database 140 and may match the RFID device metadata or a subset thereof to a dataset payload 370 (FIG. 4), described more fully below. The dataset payload 370 may be transmitted to the RFID reader/writer 110 over the network 103. A user interface may be provided by the networked server 120 to computer monitor 211, which may permit the client 200 to facilitate providing credentials 142 (FIG. 3) to a third party 220 for accessing the database 140 and software 130. Once authorized, the client 200 may manipulate the dataset payload 370 associated with a particular RFID device 100 using the computer keyboard and/or other input devices 212. The client 200 may also view raw or processed logs of a specific RFID device 100 metadata scanned by an end user 105, which may be a customer or other user.

Figure 2:
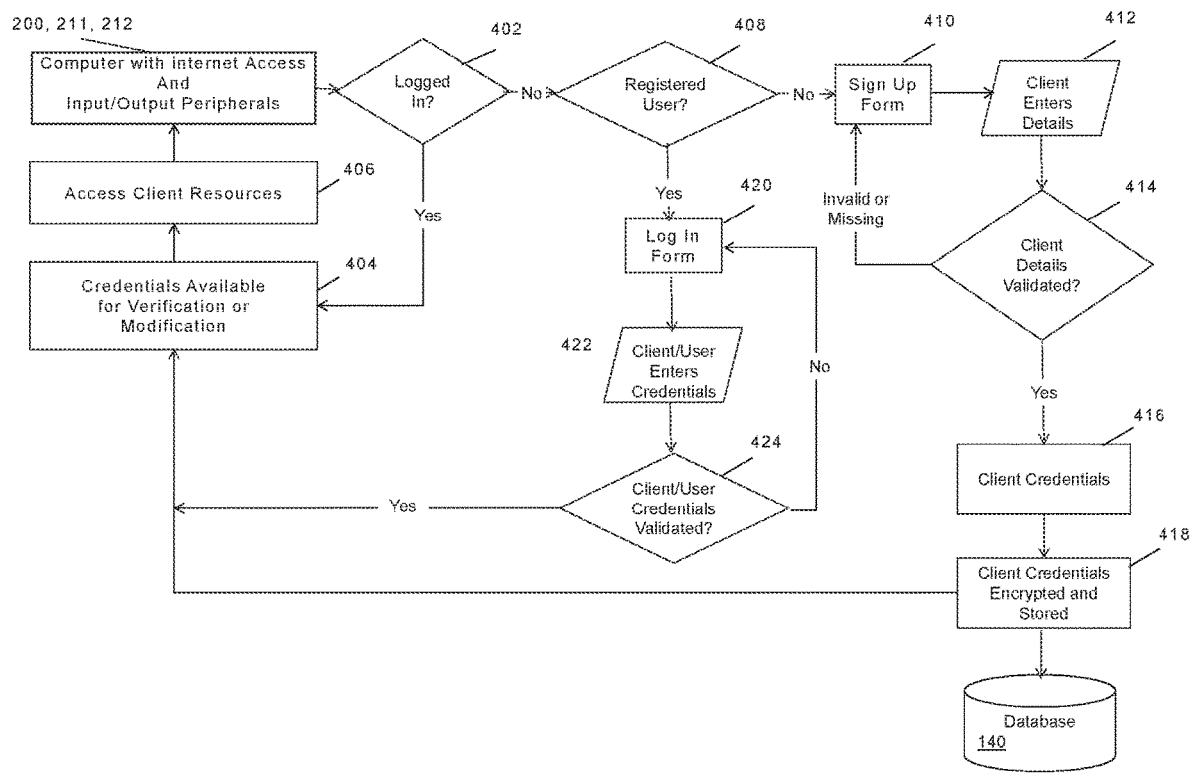
FIG. 2 is an example of an authentication process involving an authentication layer, the process performed according to principles of the disclosure.

FIG. 2 is an example of an authentication process involving an authentication layer 190, the process performed according to principles of the disclosure. A client 200 may attempt to access the software 130 at server 120. At step 402, a check may be made to determine if the client 200 is logged-in. If client 200 is already logged-in, the client 200 may access credentials at step 404. If not logged-in, then at step 408 check is made to determine whether or not the client is a registered user of the system 50. If not, a sign-up form may be displayed at the client 200 on monitor 211 for receiving data for a prospective user of the system 50. At step 412, the user may enter various details necessary to acquire credentials for using the system 50. These details may include identification data, billing data, address, contact information, and the like. At step 414, a check is made to ascertain whether or not the client details are sufficiently entered and are validated. If not, the server 120 may continue at step 410 to request missing information or present an invitation to correct invalid data.

If at step 414, the client details are validated, then at step 416 the client 200 may be granted credentials, generally referred to as client credentials, for access to system 50, and an account may be created. Tokens may also be generated for the client 200 for use in writing to RFID devices 100. At step 418, the client credentials may be encrypted and stored in database 140. The client 200 may continue to access system services such as at steps 404 and 406. At step 404, the credentials may be available to the client 200 for verification or modification, under server 120 control. At step 406, the client 200 may access client resources of the system, described in more detail below.

If at step 408 the client 200 is a registered user, then a log-in screen or form may be presented to the client. At step 422, the client 200 may enter their credentials. At step 424, if the credentials are validated, the client is logged-in. If not validated at step 424, the process continues at step 420 to continue the log-in sequence.

Figure 3:
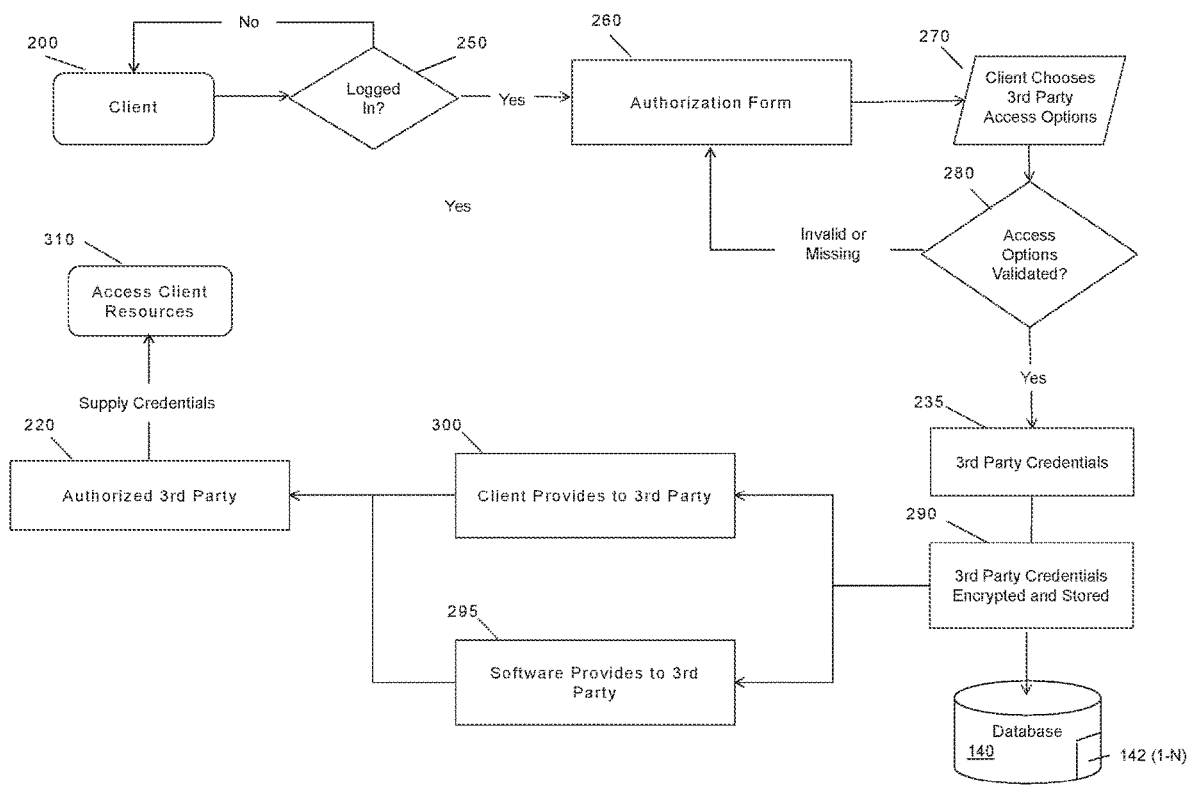
FIG. 3 is an example of creating third-party credentials, the process performed according to principles of the disclosure.

FIG. 3 is an example of creating third-party credentials, the process performed according to principles of the disclosure. A client 200 may attempt to log-in to server 120. At step 250, a check is made to determine whether or not the client is currently logged in. If not, the client 200 may continue to attempt login. If the client is logged in, at step 260 an authorization form may be provided to the client for receiving input regarding the identity of a third party who is to receive third-party credentials and associated access options. At step 270, the client may choose third-party access options to be granted to a particular third-party.

Access options that might be granted to a third-party may include but not limited to: an ability to create new datasets, an ability to list existing datasets (read-only), an ability to list and modify existing datasets (read/write) and an ability to retrieve token and/or payload details for datasets. The options may be granted or rescinded to any or all client authorized resources, or may apply to a subset of resources. The client may only grant or rescind access to resources their credentials would be authorized to access and/or modify.

At step 280, a check is made to determine if the access options pass validation. If not, the process continues to receive and revise third-party access options. If the options pass validation, then at step 235 third party credentials 142 may be created to permit a specific third-party to validly use the system 50. At step 290, the third-party credentials 142 may be encrypted and stored on database 140. The third party credentials may include an identifier for the third party, a public encryption key for the third party, an identifier for the client, a public encryption key for the client, and/or an encoded list of the access options granted by the client to the third party. The credentials may also encode an expiration time after which the credentials will no longer be authorized.

The process of FIG. 3 may continue at step 295, step 300, or both. At step 295, the software 130 may provide the generated third-party credentials to the third party 220. At step 300, the client may provide the generated third-party credentials to the third-party 220. At step 220, the third-party 220 may receive the third-party credentials 2142 establishing an authorized third-party. At step 310, the third-party may proceed to access client resources, as limited or granted by the access options created by the client 200, e.g., such as at steps 235, 270, 280 and 290. The third-party credentials 142 may permit, e.g., the third-party to create at least one second dataset and at least one second token for associating with a physical object, and for the at least one second dataset and the at least one second token to be stored in database 140.

Figure 4:
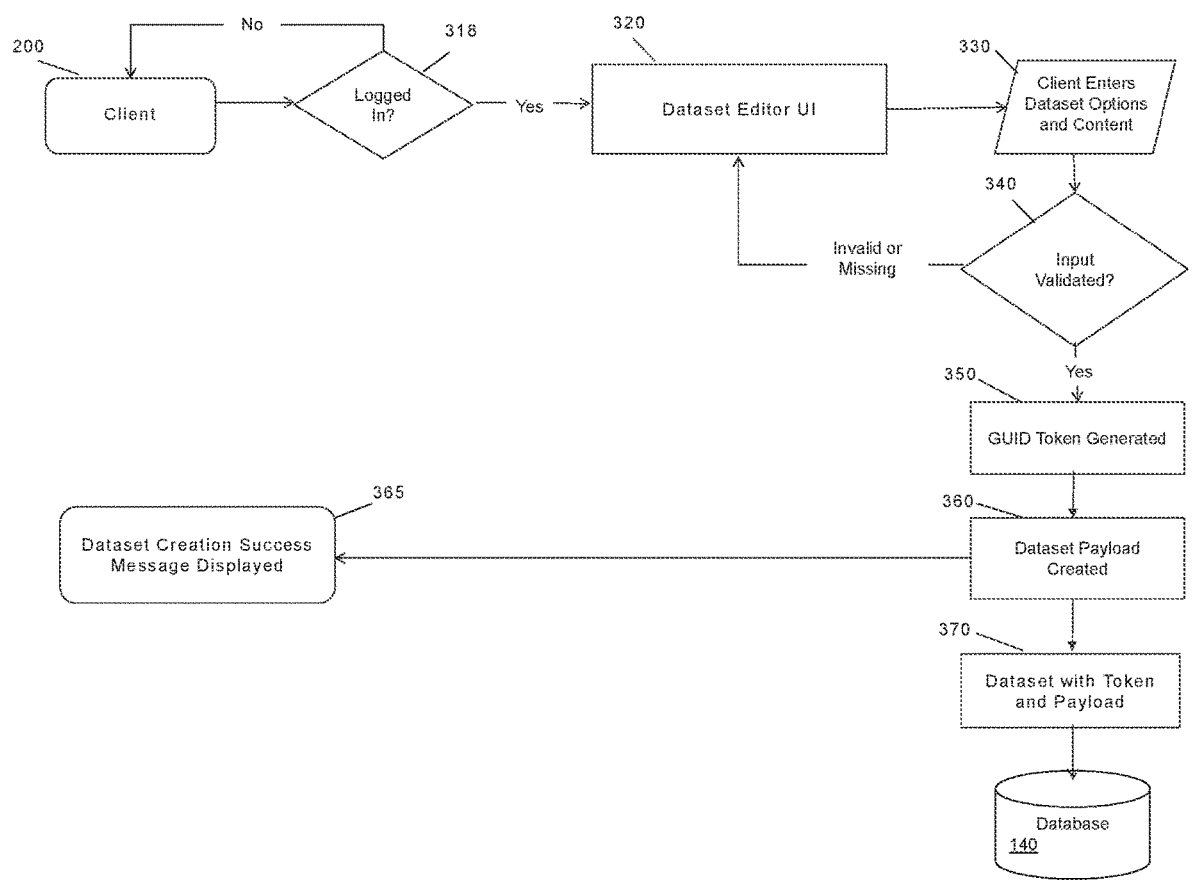
FIG. 4 is an example process for creating a dataset, the process performed according to principles of the disclosure.

FIG. 4 is an example process for creating a dataset, the process performed according to principles of the disclosure. A client 200 (alternatively, an authorized third-party who may also use the process of FIG. 3 in addition to client 200) may attempt to create a dataset using software 130. At step 318, a check is made to determine if the client 200 is logged on and if not the process waits until a client 200 is logged in. If the client 200 is logged in, then at step 320 the client 200 may access a dataset editor user interface, provided by server 130. At step 330, the client may enter dataset options and provide dataset content. At step 340, the input is validated and if not valid or missing, the process returns to step 320 to await correction. If the input is validated, then at step 350, a Globally Unique Identifier (GUID) token may be generated. At step 360, a dataset payload may be created. This payload and GUID may be any data or information that will be associated with a RFID device, described more fully below. At step 365, a dataset creation success message may be displayed or provide to the client 200. At step 370, the dataset 141 with generated GUID token 143, along with payload may be stored at database 140.

Figure 5:
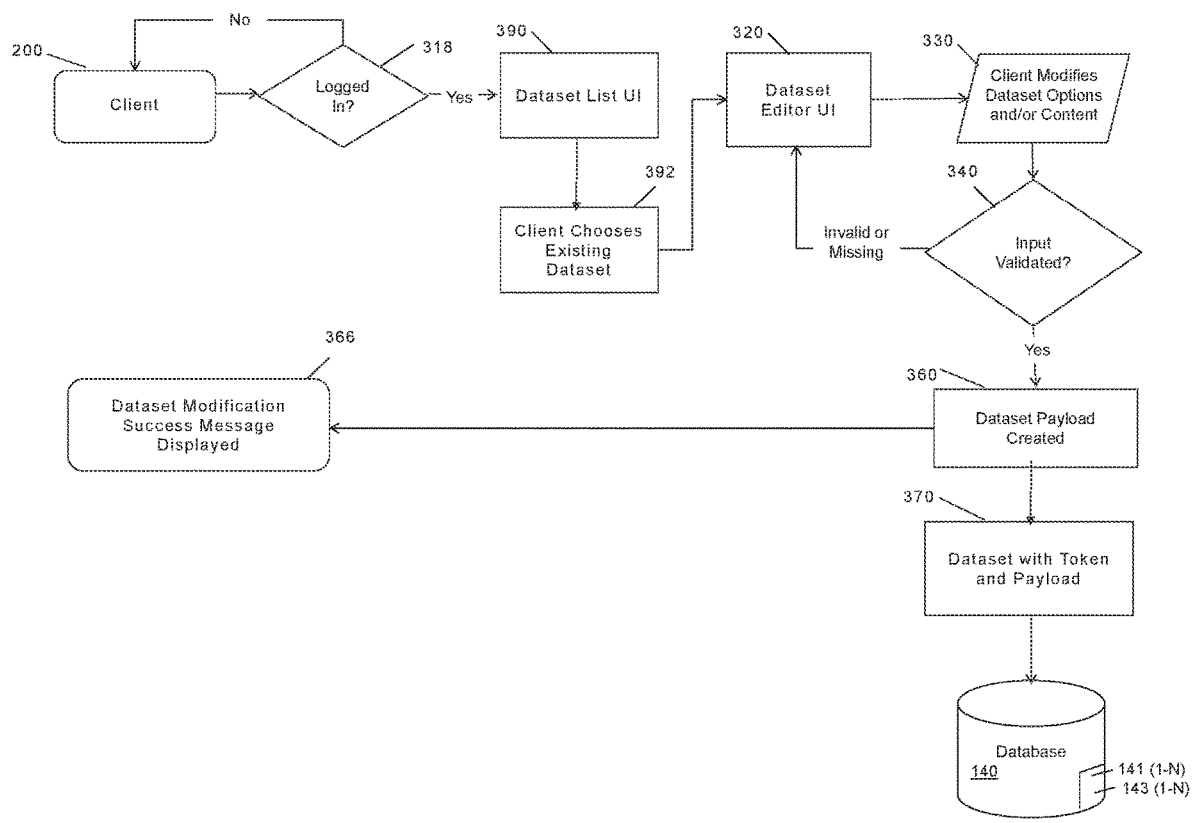
FIG. 5 is an example process for changing a payload, the process performed according to principles of the disclosure.

FIG. 5 is an example process for changing a payload, the process performed according to principles of the disclosure. Client 200 may access the server 120, and at step 318 a check may be made to determine if the client is logged in. If not logged in, the server 120 may wait until the client successfully logs in. At step 390, the client may select to display a dataset list user interface that displays a list of current datasets available for the client 200 to access. At step 392 the client may choose or select an existing dataset. At step 320, the client may employ a dataset editor user interface to select and view a particular dataset 141. At step 330, the client 200 may modify the dataset options and/or content. The dataset options may include enabling or disabling the display of the payload content, level or algorithm of encryption required, or the type of payload contents. The dataset content which may be a part of the payload may include plain text, media files such as audio, video, or images, encrypted strings, hyperlinks to other media, or credentials to access API calls. At step 340, the input may be validated. If not successful, the process may continue at step 320 and step 330. If, however, the input is successfully validated, then at step 360, the dataset payload is revised, updated or created. One or more tokens may be associated with the dataset. A dataset modification message may be displayed at step 366. The process may continue with step 370 where the revised, updated or created dataset 141 with token and payload may be stored in database 140.

Figure 6:
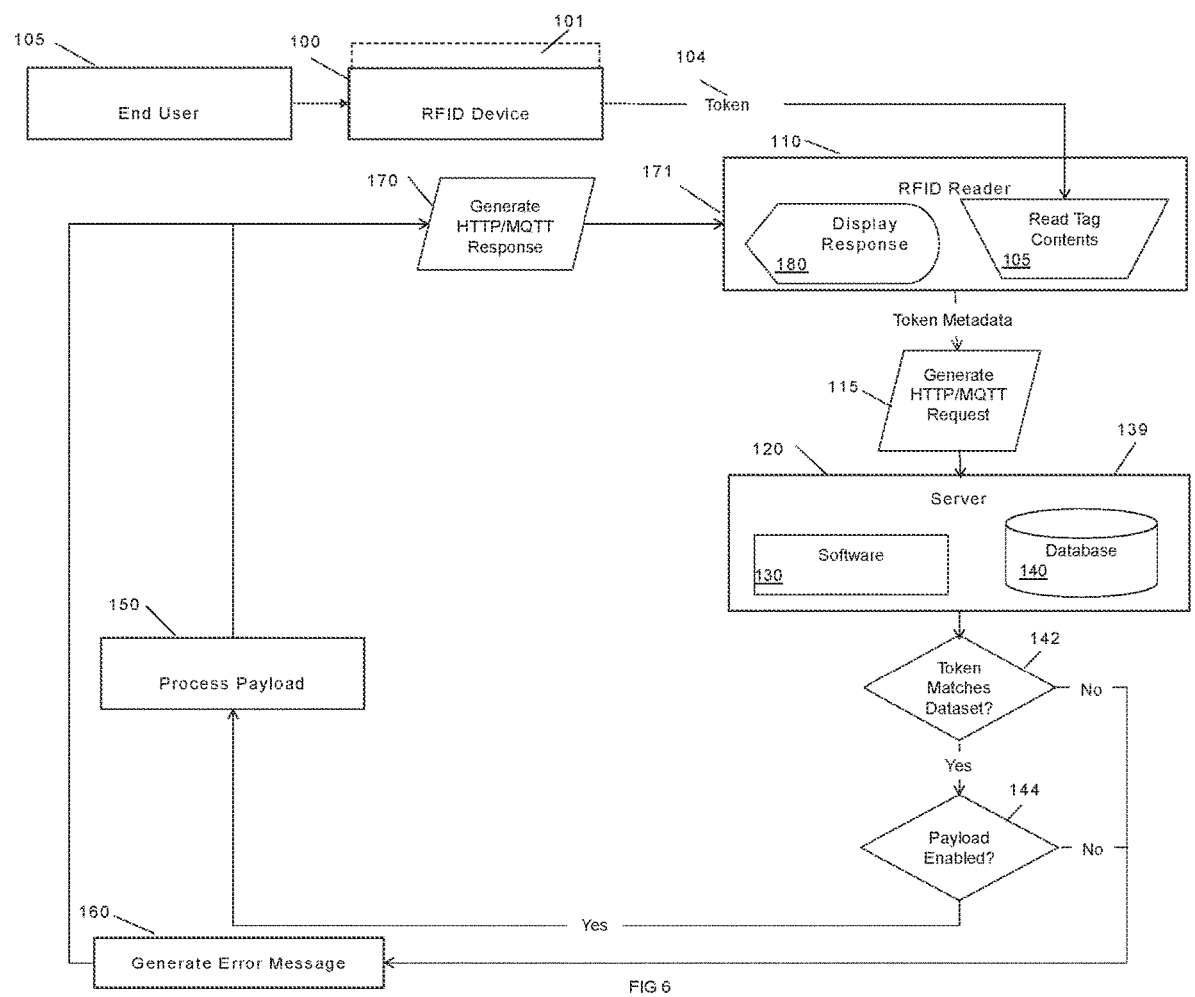
FIG. 6 is an example of a process of an end-user interaction with the system of FIG. 1, the process performed according to principles of the disclosure.

FIG. 6 is an example of a process of an end-user interaction with the system 50, the process performed according to principles of the disclosure. An end-user 105, which may be a consumer or a person may scan one of the plurality of RFID devices 100 that has been pre-programmed (e.g., involving one or more processes of FIGS. 1-5 and 7) and associated with an object or article at a RFID Reader/Writer 110. The RFID Reader/Writer 110 may read token 104 which may include token metadata and GUID previously programmed into the RFID devices 100. RFID Reader/Writer 110 may employ near field communication (NFC). The RFID Reader/Writer 110 may generate a request 115, which may be, e.g., a hypertext transfer protocol (HTTP) or Message Queuing Telemetry Transport Protocol (MQTT) Request, to server 120 and software 130, where at step 139 a search may be made of the database 140 to locate a dataset corresponding to the token. At step 142, a check may be made to determine if a specific dataset of among many that may be stored in database 140 corresponds to the token 104 as scanned by the RFID Reader/Writer 110 and received in the request 115 by the server 120 and software 130. If the token matches the dataset, then a check is made at step 144 to determine whether or not the payload is enabled for this dataset. An enable/disable option may be a control option managed by a client or authorized third party, e.g., at step 330 of FIG. 4. If the payload is enabled, then the payload may be processed at step 150. At step 170, a response 170, e.g., an HTTP/MQTT type of response may be sent to the RFID Reader/Writer 110. At step 171, the payload may be displayed at the display 180 for viewing by an end user 105. The payload may be any data or information that was previously uploaded as part of the dataset. For example, the payload may be information related to the article 101 with which the RFID device 100 is associated; the payload may be coupon-related information associated with the article 101; the payload may be status information of the RFID device 100; the payload may be an acknowledgement of the RFID device 100 being scanned such as used for tracking purposes of the article (which may include geographic information being tracked), or the like. If the payload was not enabled at step 144 or if the token does not match a dataset at step 142, then an error message 160 may be sent and displayed on display 180.

Figure 7:
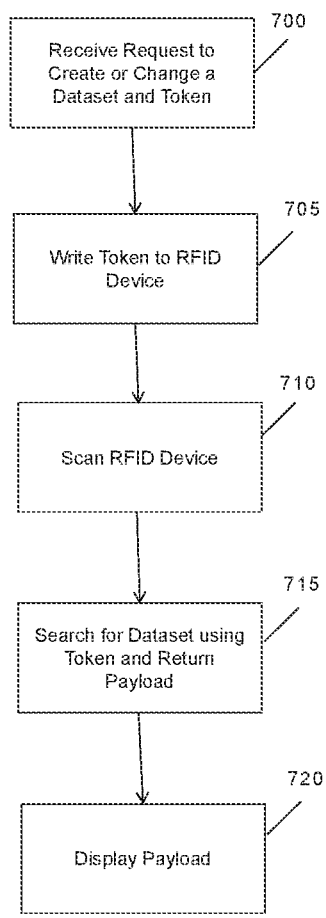
FIG. 7 is an example process for using the system of FIG. 1, the steps performed according to principles of the disclosure

FIG. 7 is an example process for using the system 50, the steps performed according to principles of the disclosure. At step 700, a request may be received at server 120 to create a dataset and token, or the request may be to change a dataset associated with an already created token. The received request may be from a client 200 or authorized third party 220 to change the payload of the stored dataset associated with the token 104 from a first set of information to a second set of information different from the first set of information. In this way, payloads may be dynamically altered so that different information can be conveyed to displays 180 at different times for the same RFID devices 100, thereby giving an ability to change the nature of data/information associated with the RFID devices 100 over time, and/or to track those RFID devices over time. At step 705, the token 104 and any metadata may be written to an RFID device 100. This token may be permanently written. The RFID device and RFID writer 110 may be NFC devices. At step 710, the RFID device may be scanned, such as by, e.g., RFID reader/writer 110. A token 104 and any metadata may be sent to a server 120. At step 715, the token may be used to search for and locate a dataset in database 140, and a payload associated with the dataset may be communicated over network 103 to a display device 180. At step 720, the information contained in the payload may be displayed.

By providing a remote networked computer to log and match scanned RFID devices 100 against a database 140, custom dataset payloads may be provided to end users 105 without reprogramming the RFID device 100. The software 130 may also provide detailed metrics derived from scanned RFID device logs, providing a meaningful improvement to management speed and insight. The metrics may include such information as the specific RFID device 100 scanned, what dataset payload was displayed to the end user, the geographic location in which the scan occurred, when the scan occurred, and information regarding the make, model, firmware, or other specifics of the RFID reader/writer 110 used.

With the features described herein, instead of a custom RFID management solution for each vendor and client as is presently the traditionally known technique, the system and processes herein is device agnostic, and does not specify a particular RFID or portable reader/writer technology, making it adaptive and robust to future developments. This network-based software 130 enables remote management and auditing of RFID devices at a scale that is not possible with current methodologies. The existing processes used for managing RFID device content and encoding require physical interaction with the specific RFID device at each stage of deployment, usually within close proximity. In order to update a deployed RFID device, an RFID reader/writer must be brought near the device, the device identification verified, and an encoding cycle initiated. In order to support future encoding cycles, the device must be left in an unlocked state, potentially risking undesired modifications to the encoded data. The existing implementation and testing of these custom solutions is a slow process that impedes adoption. In addition, the cost of scaling deployment of these devices is prohibitive and restricts potential applications to internal uses. High labor force requirements and logistics difficulties currently prevent frequent audits of deployed RFID devices. In contrast, the invention permits the updating of RFID device payloads without physical access to the device(s), enabling a single client to update thousands of records per minute. The physical locking of the device also prevents undesired modifications to the encoded information.

In one aspect, the software 130 may act as a gateway for incoming information that is processed before a response is returned. Incoming information may be in the form of, but not limited to:
    scanned metadata, in which case it is stored and compared to a database of dataset payloads.
    a request to access the management interface via client credentials.

new or modified dataset payload information to store in the database.
a request to view device logs or metadata from an authorized client.

Responses may be in the form of, but not limited to:
matched dataset payloads.
granted access to the client interface and/or resources.
denied access to the client interface and/or resources.
graphical elements from the management interface to the client interface.
status, error, or control messages displayed to client or end user devices.

The dataset payloads may be retrieved, processed (such as e.g., for API calls or links), and packaged for response to the end user's computing device using a standard network or internet connection. Clients may access the server 120 via authorized credentials and a standard computer with internet or network access. The server 120 may facilitate these interactions by receiving information via the network connection 103, providing access to the database 140, and executing the software 130. The server 102 may render a graphical user interface that is displayed to the client, which may permit indirect access to stored dataset payloads and scanned device logs (that may be stored on database 140), whether raw or processed.

Once setup is completed and the dataset payload entered into the database 140, the dataset token and/or metadata may be physically encoded on the RFID device 100. An RFID writer 110 is provided with the dataset token and/or metadata, usually via a network 103 connection. The RFID writer 110 and RFID device 100 may be brought within close proximity, which is maintained for the encoding cycle. The one or more RFID devices 100 may contain fixed or configurable memory locations. Token and/or metadata information may be encoded into the configurable memory location via specific RF protocols generated between the RFID writer 110 and RFID device 100. The RFID writer 110 firmware must be configured to handle the specific encoding and locking protocols used, which typically are dependent on the specific device memory mapping and communication frequency. The RFID device 100 may be encoded into a write-once-read-many (WORM) configuration, using lock bits at specific memory locations to prevent future encoding cycles. This locking cycle physically prevents the configurable memory from being modified. Once encoded and locked, the RFID device 100 is permanently programmed with the dataset token and/or metadata.

The end user 105 may choose an RFID device 100 to scan and transmit metadata to the remote server 120. The metadata may be compared against the database 140 of known dataset payloads, and the proper dataset payload returned to RFID reader/writer 110, if one exists. If one does not exist, no dataset payload should be returned, although an appropriate error code or status message may be returned instead to RFID reader/writer 110. Clients should attempt to access the remote software using credentials. These credentials are processed for transmission using an encryption subroutine. Once received on the server 120, the credentials may be decrypted using a complementary decryption subroutine. The software 130 may compare the credentials against the database of known credentials, granting access only when the credentials are properly authorized. Once the client 200 may have gained access, the client may choose an RFID device 100 to edit or to view access logs and metadata. Groups of RFID devices 100 may also be chosen to be viewed in conjunction to provide the most effective analysis of the stored data.

The database 140 and software 130 may be configured to support a distributed computer system, whereby the number of computer devices providing the service described herein may change on demand. The server 130 may comprise two or more computing devices configured behind a load balancing device. This may permit failover scenarios and consistent performance when a single computing device is under heavy compute load. In order to support a higher number of simultaneous device scans, database interactions, and/or authentication processes, the server capacity may be increased by adding additional computers containing the software to the load balancer(s). These computers may be entirely physical networked machines, or virtual constructs, such as a virtual private server (VPS). This flexibility extends to the database layer as well, as it is designed to support multiple read/write components and replicate any modifications between all components in a controlled and consistent manner. The scaling of the server and/or database capacity can occur based on monitored or predicted load conditions, scaling in reaction to, or in advance of, changes in the End User, Client, or software compute needs.

Several examples of using the principles of the disclosure follows. As a first example, a brochure advertising a product with additional information contained in the payload, or a business card embedded with a hyperlink to the company website. Another example of usage may be an ID badge which when scanned calls an API to handle clock in/clock out records in a third party software package. Yet another example may be a manufacturer may place unique RFID devices on each product to track its serial number, end customer, or other details throughout the manufacturing process. A further example may include an NFC enabled keyfob that could be scanned by a door mounted RFID reader to authorize an electronic door unlocking procedure. In another example, a consumer good may be equipped with an RFID label that displays product information when scanned by an unauthorized consumer RFID reader, or displays inventory and tracking information when scanned by an authorized RFID reader, such as used by an employee. In still yet another example, a retail company may place an RFID tag linked to a consumer survey to solicit feedback; the survey may be changed weekly to solicit different types of feedback.

Although the foregoing description has been described by reference to various examples, it is to be understood that modifications and alterations in the structure and arrangement of those examples may be achieved by those skilled in the art and that such modifications and alterations can be practiced in the spirit of the appended claims. The examples herein are merely illustrative and are not meant to be an exhaustive list of all possible designs, examples or modifications of the disclosure.

What is claimed is:

1. A system for tracking articles or providing information, the systems comprising:
an RFID reader, the RFID reader to read one of a plurality of RFID devices to receive at least one token from among a plurality of tokens, each of the RFID devices physically associated with one or more objects;
a server to receive a request from the RFID reader over a network, the request including the at least one token, and the server configured to send at least one payload to the RFID reader over the network; and
a database accessible by the server to store a plurality of datasets and a plurality of payloads including the at least one payload, the database searchable by the server using the received token;

wherein the at least one payload is created by an authorized third party having third party access options that control access to the plurality of datasets for creating the at least one payload, the third party access options provided by a client, as credentials of the client, which authorize the client to grant the third party access options.

2. The system of claim 1, wherein the RFID device is a near field communication device.

3. The system of claim 1, wherein the token comprises a globally unique identifier (GUID).

4. The system of claim 3, wherein the at least one token is permanently encoded on the one of a plurality of RFID devices.

5. The system of claim 3, wherein the at least one token comprises a plurality of different tokens and each different token is permanently encoded on a different at least one of the plurality of RFID devices.

6. The system of claim 1, wherein the at least one payload comprise information related to the one or more objects.

7. The system of claim 1, wherein the server tracks the location of the one of a plurality of RFID devices.

8. The system of claim 1, further comprising an RFID writer to permanently write the at least one token to the one of the plurality of RFID devices.

9. The system of claim 8, wherein the RFID writer writes metadata to the one of the plurality of RFID devices.

10. The system of claim 1, wherein the server generates at the request of a client encrypted third-party credentials that limit or grant access to one or more resources by a plurality of third parties including an encoded list of access options granted by a client.

11. The system of claim 1, wherein the server generates, at the request of a client, third-party credentials that limit or grant access to one or more resources by a plurality of third parties, the third-party credentials denoting an ability to create a new dataset and a new token for associating with the one or more objects.

12. The system of claim 11, wherein the third-party credentials include an expiration time after which the third-party credentials will no longer be authorized.

* * * * *